United States Patent
Yang et al.

(10) Patent No.: US 10,165,444 B2
(45) Date of Patent: Dec. 25, 2018

(54) DATA TRANSMISSION APPARATUS AND METHOD

(71) Applicant: DOOSAN HEAVY INDUSTRIES & CONSTRUCTION CO., LTD., Gyeongsangnam-do (KR)

(72) Inventors: Seong Yeol Yang, Gyeonggi-do (KR); Seung Min Chae, Seoul (KR); Seung Yup Kang, Gyeonggi-do (KR); Hee Tae Lee, Gyeongsangnam-do (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 15/699,238

(22) Filed: Sep. 8, 2017

(65) Prior Publication Data

US 2018/0077574 A1 Mar. 15, 2018

(30) Foreign Application Priority Data

Sep. 9, 2016 (KR) .................. 10-2016-0116315

(51) Int. Cl.
| | | |
|---|---|---|
| H04W 12/06 | (2009.01) | |
| H04L 29/06 | (2006.01) | |
| H04W 4/06 | (2009.01) | |
| H04W 12/04 | (2009.01) | |
| H04L 12/18 | (2006.01) | |

(52) U.S. Cl.
CPC ......... H04W 12/06 (2013.01); H04L 63/0428 (2013.01); H04L 63/06 (2013.01); H04L 63/062 (2013.01); H04L 63/08 (2013.01); H04W 4/06 (2013.01); H04W 12/04 (2013.01); H04L 12/18 (2013.01); H04L 2209/601 (2013.01)

(58) Field of Classification Search
CPC ....... H04W 12/06; H04W 12/04; H04W 4/06; H04L 63/0428; H04L 63/06; H04L 63/062; H04L 63/08; H04L 12/18; H04L 2209/601
USPC ......................................................... 455/411
See application file for complete search history.

(56) References Cited

U.S. PATENT DOCUMENTS 7,581,110 B1 8/2009 Probasco
9,224,272 B2 * 12/2015 Morris ................... G06Q 20/10
(Continued)

FOREIGN PATENT DOCUMENTS

| KR | 20100103882 A | 9/2010 |
|---|---|---|
| KR | 20130100000 A | 9/2013 |
| KR | 20160008874 A | 1/2016 |

OTHER PUBLICATIONS

Korean Office Action issued by the Korean Intellectual Property Office dated Dec. 14, 2017 in connection with Korean patent application No. 10-2016-0116315.
(Continued)

*Primary Examiner* — Mong-Thuy T Tran
(74) *Attorney, Agent, or Firm* — Invenstone Patent, LLC

(57) ABSTRACT

A data transmission method includes requesting, by a plurality of transceivers, an authentication to a main controller, transmitting an authentication acceptance signal and separate decoding keys from the main controller to the transceivers, transmitting an encoded data bundle from the main controller to the transceivers and extracting, by each of the transceivers, some of data in the at least one encoded data bundle using the decoding key.

20 Claims, 8 Drawing Sheets

(56) References Cited

U.S. PATENT DOCUMENTS

| | | | |
|---|---|---|---|
| 2005/0094812 A1* | 5/2005 | Terekhova | H04N 7/162 380/201 |
| 2006/0059342 A1* | 3/2006 | Medvinsky | H04L 9/0822 713/168 |
| 2006/0107285 A1* | 5/2006 | Medvinsky | H04N 7/1675 725/25 |
| 2007/0033400 A1* | 2/2007 | Senez, Jr. | H04L 63/0428 713/168 |
| 2009/0190757 A1* | 7/2009 | Chen | H04N 7/1675 380/242 |
| 2012/0131333 A1* | 5/2012 | Zhang | H04L 9/0825 713/156 |
| 2014/0052989 A1* | 2/2014 | Jones | G06F 21/72 713/171 |
| 2016/0028698 A1* | 1/2016 | Antipa | H04L 9/3066 713/150 |
| 2017/0201497 A1* | 7/2017 | Rhyu | H04L 63/0428 |
| 2017/0272361 A1* | 9/2017 | Speight | H04L 45/745 |

OTHER PUBLICATIONS

Korean Office Action issued by the Korean Intellectual Property Office on Jun. 4, 2018 in connection with Korean Patent Application No. 10-2016-0116315.

* cited by examiner

[Fig. 1]
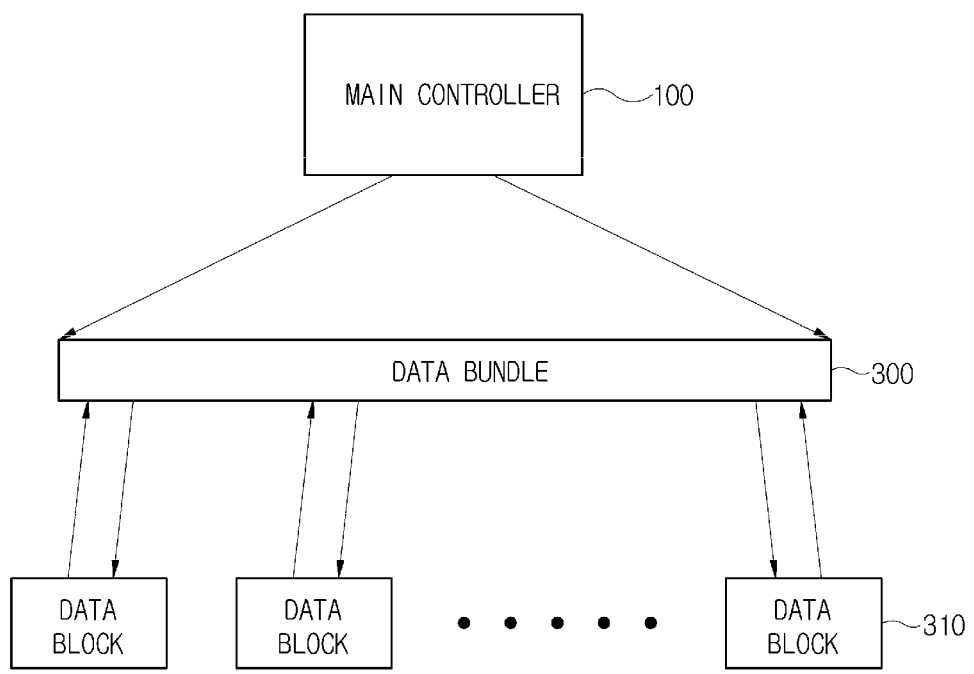

[Fig. 2]
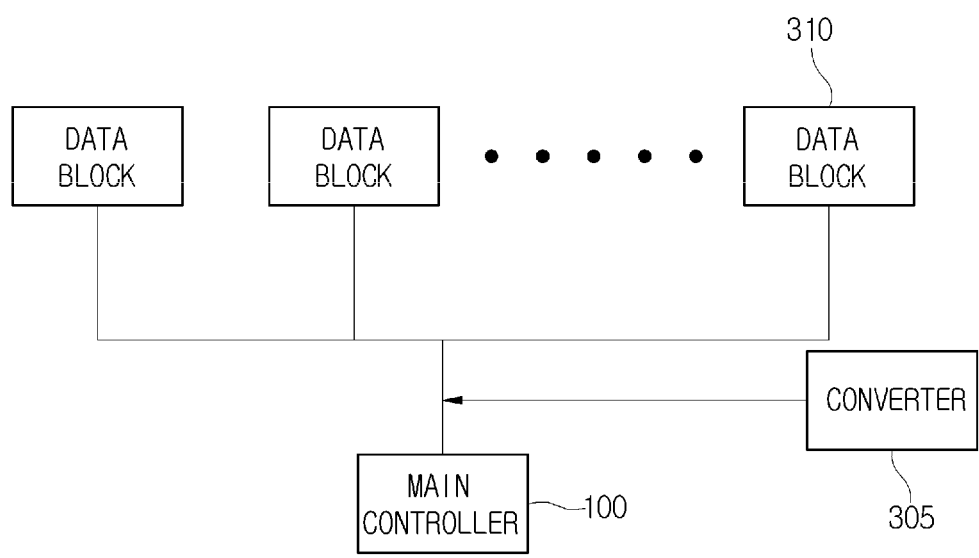

[Fig. 3]
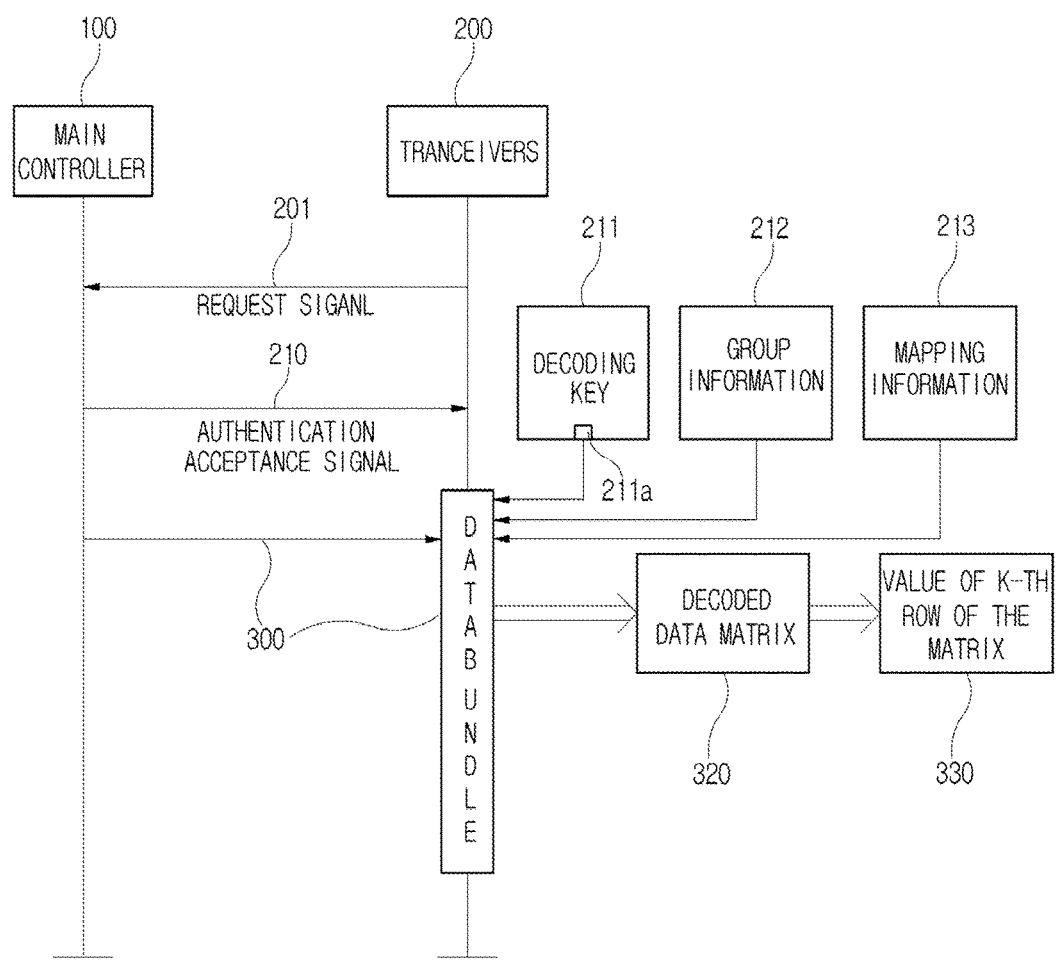

[FIG. 4]
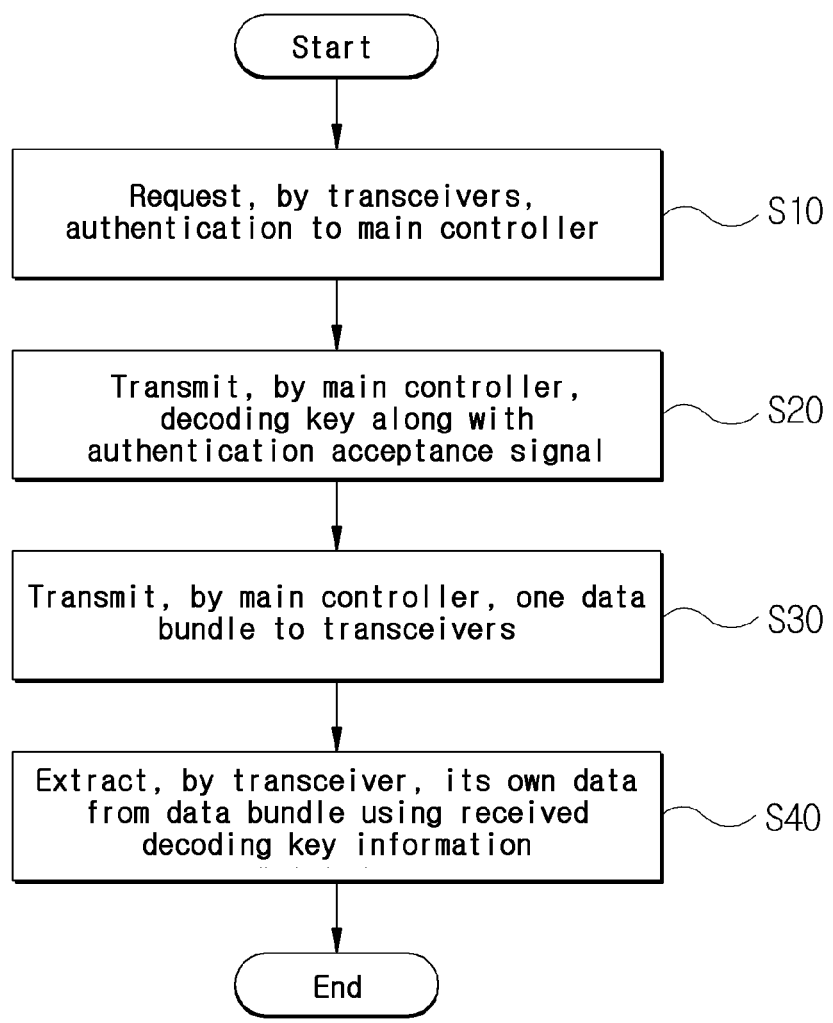

[Fig. 5]
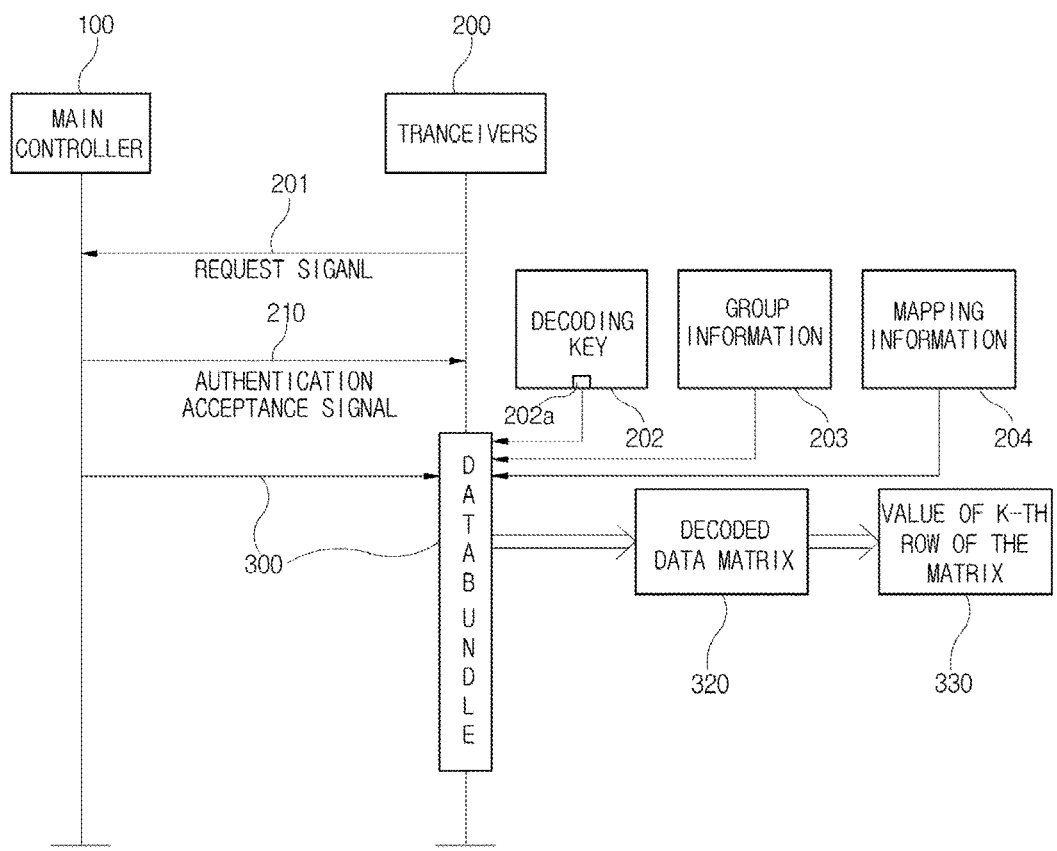

[FIG. 6]
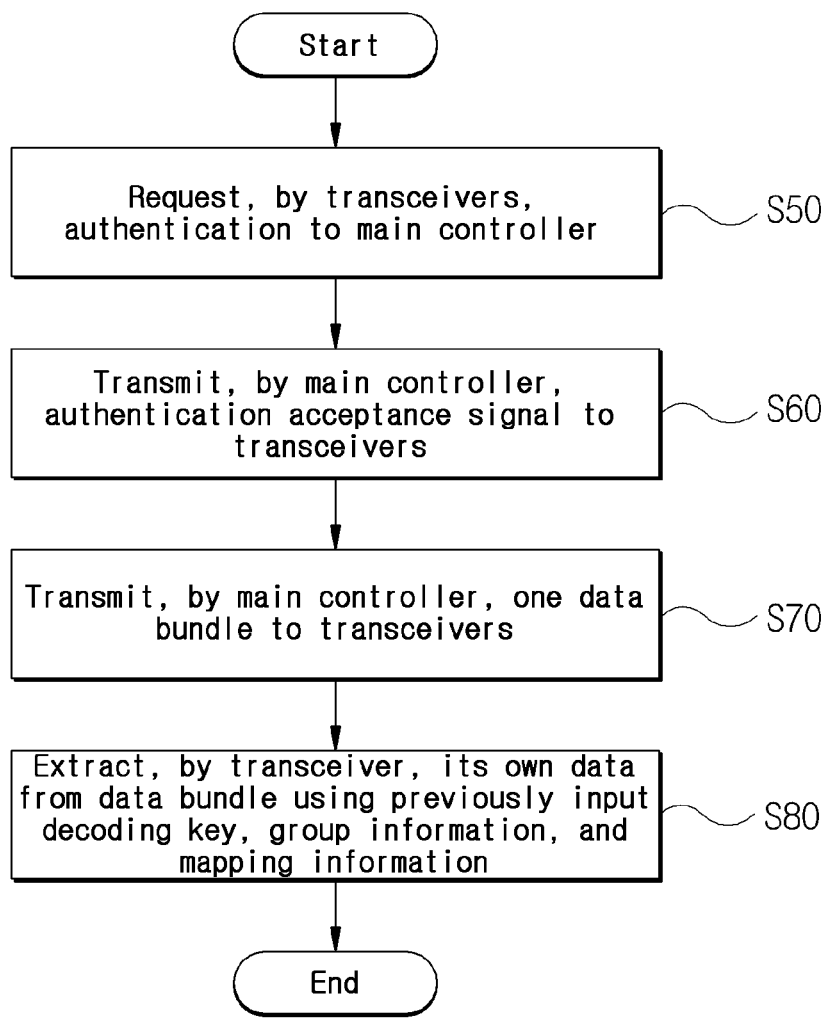

[Fig. 7]
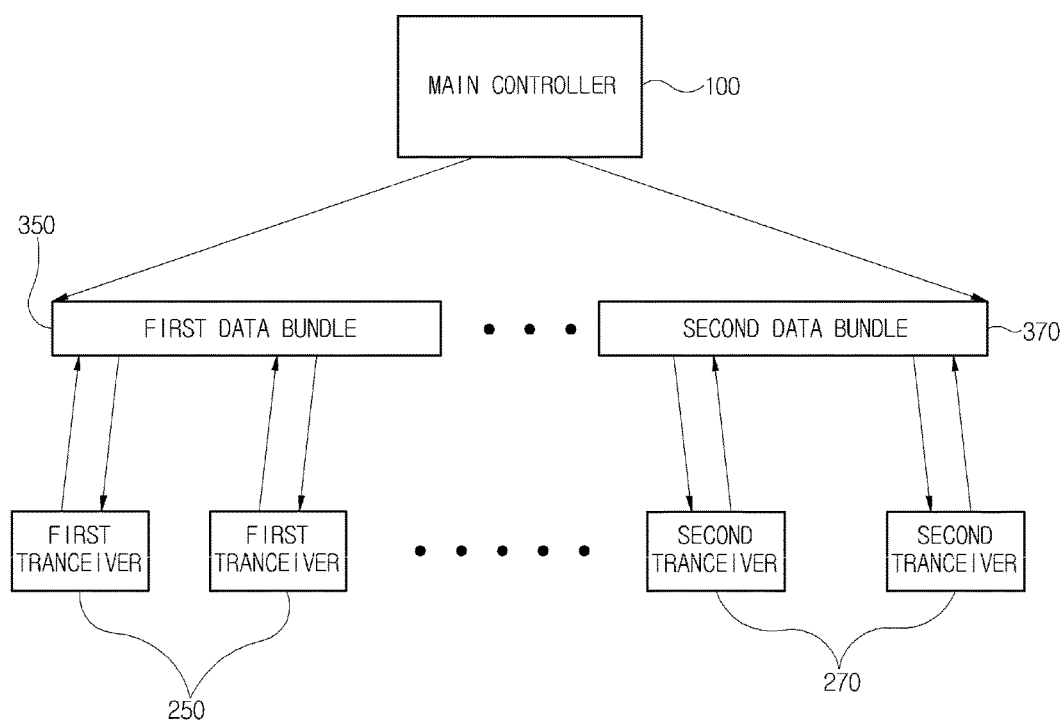

[FIG. 8]
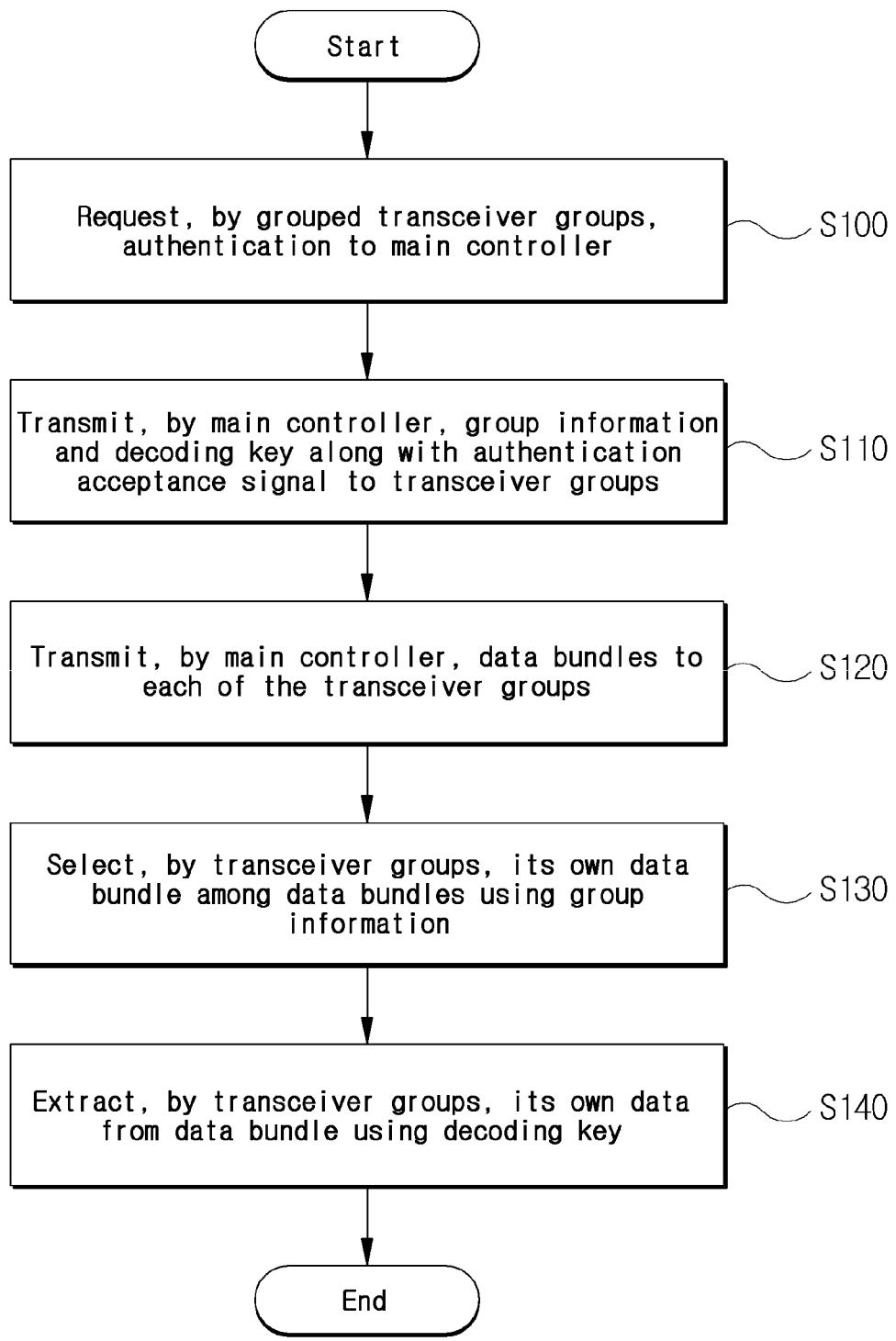

DATA TRANSMISSION APPARATUS AND METHOD

CROSS-REFERENCE TO RELATED APPLICATION

This application claims priority to Korean Patent Application No. 10-2016-0116315, filed on Sep. 9, 2016, the disclosure of which is incorporated herein by reference in its entirety.

BACKGROUND

Exemplary embodiments of the present disclosure relate to a data transmission method, and more particularly, to a method for transmitting encoded data.

In wireless communications, a data transmission mode may be broadly classified into a unicast mode, a multicast mode, and a broadcast mode. Generally, in order to transmit data in the unicast mode, a wireless channel is required for each device, in which the wireless channel may be transmitted by being divided into time, frequency, or code. The unicast mode may be usefully used when transmitting different data for each receiver. When an error occurs during transmission in the unicast mode, a sender may retransmit data with errors through a feedback channel assigned to each device based on an acknowledgment (ACK) response or negative acknowledgment (NACK).

In general multicast or broadcast communications, the same information is transmitted to the corresponding user. Therefore, unlike the unicast mode, data is transmitted to all receivers through a common channel. The mode has an advantage of transmitting data to many receivers with relatively little radio resources.

BRIEF SUMMARY

An object of the present disclosure is to provide a data transmission method capable of transmitting data between a main controller and transceivers at a high speed.

Other objects and advantages of the present disclosure can be understood by the following description, and become apparent with reference to the embodiments.

In accordance with one aspect of the present disclosure, there is provided a data transmission method. The data transmission method includes: requesting, by a plurality of transceivers, an authentication to a main controller; transmitting an authentication acceptance signal and separate decoding keys from the main controller to the transceivers; transmitting an encoded data bundle from the main controller to the transceivers; and extracting, by each of the transceivers, some of data in the at least one encoded data bundle using the decoding key.

The plurality of data blocks may be encoded by an encoding key to form the at least one encoded data bundle.

Some of data extracted from the transceivers may be different data.

The decoding key may include a key header figuring out a location of its own data in the data bundle.

The main controller may transmit a changed decoding key to the transceivers if the decoding key transmitted to the transceivers is changed.

The main controller may transmit the changed mapping information matching each of the changed decoding keys to the transceiver.

The data transmission method may further include transmitting, by the main controller, separate mapping information of each of the transceivers while the main controller transmitting the decoding keys, and the transceivers may figure out a location of their own data in the data bundle using the received mapping information.

The mapping information may each include unique information, and the mapping information and the decoding key transmitted to the one transceiver may match each other.

The data transmission method may further include: classifying the transceivers by group before the authentication request, in which the main controller may transmit the data bundle to each group of the transceivers.

The data transmission method may further include transmitting, by the main controller, separate group information of each of the transceivers while the main controller transmitting the decoding keys, and the transceivers may determine a data to be received in the data bundle using the received group information.

The main controller may transmit the plurality of data bundles to the transceivers and the transceivers may select a data bundle to be received among the plurality of data bundles based on the group information.

In accordance with another aspect of the present disclosure, there is provided a data transmission method. The data transmission method includes: requesting, by a plurality of transceivers to which separate decoding keys are previously input, an authentication to a main controller signal; transmitting, by the main controller, an authentication acceptance signal to the transceivers; transmitting, by the main controller, an encrypted data bundle to the transceivers in a broadcast or multicast mode; and decoding, by each of the transceivers, some of data corresponding to the previously input decoding key in the encoded data bundle.

Each of the decoding keys may include a key header figuring out a location of its own data in the data bundle, and each of the transceivers may decode only some of the data bundle using the key header and the decoding key.

The data transmission method may further include previously inputting the corresponding separate mapping information to each of the transceivers, in which the transceivers may figure out a location of its own data in the encoded data bundle using the mapping information and extracts data corresponding to the decoding key.

If the previously input decoding key is changed, the main controller may transmit the changed decoding keys to the transceivers.

The main controller may transmit the changed mapping information matching each of the changed decoding keys to the transceiver.

The transceivers may include a plurality of grouped transceiver groups and the main controller may transmit the plurality of grouped data bundles to each of the plurality of transceiver groups.

The transmitting, by the main controller, the authentication acceptance signal to the transceivers may further include transmitting separate group information to each of the transceiver groups and the transceiver groups may select the data bundle to be received among the plurality of data bundles using the group information.

The main controller may transmit the plurality of data bundles in the multicast mode.

The plurality of data blocks may be encoded by an encoding key to form the at least one encoded data bundle.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram schematically showing a data transmission system according to an exemplary embodiment of the present disclosure;

FIG. 2 is a diagram showing a method of encoding data according to the exemplary embodiment of the present disclosure;

FIG. 3 is a diagram showing a method for processing data by a transceiver according to an exemplary embodiment of the present disclosure;

FIG. 4 is a flowchart illustrating a data transmission method between a main controller and a transceiver according to an embodiment of the present disclosure;

FIG. 5 is a diagram showing a method for processing data by a transceiver according to another exemplary embodiment of the present disclosure;

FIG. 6 is a flowchart illustrating a data transmission method between a main controller and a transceiver according to another embodiment of the present disclosure;

FIG. 7 is a diagram schematically showing a data transmission system according to another exemplary embodiment of the present disclosure; and FIG. 8 is a flowchart illustrating a data transmission method between a main controller and a transceiver according still another embodiment of the present disclosure.

DETAILED DESCRIPTION

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. Like reference numerals throughout the description denote like elements.

FIG. 1 is a diagram schematically showing a data transmission system according to an exemplary embodiment of the present disclosure.

Referring to FIG. 1, a data transmission system may include a main controller 100 and a plurality of transceivers 200. For example, the main controller 100 may be a central processing unit, and the transceivers 200 may be input/output devices capable of transmitting and receiving data. The main controller 100 may transmit a data bundle 300 to the plurality of transceivers 200 in a broadcast or multicast transmission mode. According to the present embodiment, a system for transmitting data in the broadcast transmission mode will be described.

The main controller 100 may transmit one data bundle 300 to the plurality of transceivers 200. At this time, the data bundle 300 may include data corresponding to each of the transceivers 200. Each of the plurality of transceivers 200 may identify a location where their own data exists in the data bundle 300 using unique decoding key information and extract their own data from the data bundle 300. Since each of the transceivers 200 has a separate decoding key, the transceivers 200 may not extract data that does not correspond to their own decoding keys. Accordingly, the transceivers 200 may not receive unnecessary data, thereby more quickly enabling data processing.

According to the embodiment of the present disclosure, the main controller 100 may transmit one data bundle 300 without having to transmit data to each of the transceivers 200. Therefore, the transmission frequency of data from the main controller 100 to the transceivers 200 may be reduced.

Further, if separate data are transmitted to each of the transceivers 200, a control command and a data transmission time may be delayed according to a polling period. However, the main controller 100 may transmit control commands and data to the transceivers 200 at a high speed by transmitting one data bundle 300 as in the embodiment of the present disclosure.

The embodiments of the present disclosure may be applied to various communication systems. A wireless communication network may be applied to various wireless communication systems using various air interfaces and/or physical layers (e.g., frequency division multiple access (FDMA), time division multiple access (TDMA), code division multiple access (CDMA), wideband CDMA (W-CDMA), and universal mobile telecommunications system (UMTS), long term evolution (LTE) of the UMTS, and global system for mobile communications (GSM)).

FIG. 2 is a diagram showing a method of encoding data according to the exemplary embodiment of the present disclosure.

Referring to FIGS. 1 and 2, a plurality of data blocks 310 may be combined to form one data bundle 300. Each data block 310 may include data corresponding to one of the plurality of transceivers 200. The converter 305 may encode the data bundle 300 by a unique encoding key and set a plurality of decoding keys for decoding the data bundle 300. In addition, the converter 305 may set group information and mapping information in each of the data blocks 310.

The converter 305 may classify the transceivers 200 by group according to the characteristics and types of the transceivers 200 and classify the transceivers 200 and the data blocks 310 corresponding to the transceivers 200 by group. The group information is information for allowing the transceiver 200 to determine data of its own group in the data bundle 300. The converter 305 may set the decoding keys corresponding to each of the transceivers 200. The decoding key is information for decoding the encoded data. The converter 305 may set mapping information to determine locations of each of the data blocks 310. The mapping information is information for identifying a location of its own data among data determined by the group information.

The data blocks 310 in which the group information, the decoding key, and the mapping information are set may be combined into one data bundle 300 and transmitted to the main controller 100.

The converter 305 may be a component of the main controller 100.

FIG. 3 is a diagram illustrating a method of processing data by a transceiver according to an embodiment of the present disclosure and FIG. 4 is a flowchart illustrating a data transmission method between a main controller and a transceiver according to an embodiment of the present disclosure.

Referring to FIGS. 3 and 4, the transceivers 200 may transmit an authentication request signal 201 to the main controller 100. The main controller 100 may recognize that the transceivers 200 are ready to receive data through the authentication request (S10). The main controller 100, which receives the authentication request signal of the transceivers 200, may transmit the decoding key 211 to the transceivers 200 along with an authentication acceptance signal 210 (S20). In some embodiments, the main controller 100 may additionally transmit the group information 212 and the mapping information 213 to the transceivers 200. The main controller 100 may again transmit the decoding key 211 to the transceivers 200 when the decoding key 211 transmitted to the transceivers 200 is changed. The main controller 100 may transmit the changed mapping information 213 that matches the changed decoding key 211. Then, the main processor 100 may transmit the data bundle 300. The data bundle 300 may be transmitted to the plurality of transceivers 200 in a broadcast mode (S30). The transceivers 200 may decode the encoded data bundle 300 using the decoding key 211. At this time, only the data encoded by the encoding key corresponding to the decoding key 211 may be decoded, and the data encoded by the encoding key that does not correspond to the decoding key 211 may not be decoded. That is, the transceivers 200 may decode and extract only some of data corresponding to their own decoding keys 211 in the data bundle 300. The data extracted by each of the transceivers 200 may be data including different information. In this way, the transceivers 200 may extract only the data to be received using the unique decoding key 211. In this case, the decoding key 211 may include a key header 211a that may figure out the location of data to be decoded by each of the transceivers in the data bundle. The decoding key 211 and the key header 211a transmitted to one transceiver 200 may match each other. That is, the transceiver 200 may decode the desired data only when the decoding key 211 and the key header 211a match each other (S40).

For example, in a matrix operation, some of data in the data bundle 300 may be extracted using the decoding key 211. The encoded data bundle 300 may include an m×n matrix (m is the number of transceivers, n is the number of data blocks, m and n are natural numbers, and m and n may be the same or different), and a decoding matrix may include an n×n matrix (n is the number of data blocks and n is a natural number). In the matrix operation, the decoding key 211 may be a value arranged in a specific row of the n×n decoding matrix or may be an n×n decoding matrix itself. All values of the remaining rows other than at least one row having a predetermined value in the decoding matrix may be 0. A decoded data matrix may be obtained by multiplying an m×n matrix included in the data bundle 300 by the decoding matrix n×n matrix, and the decoded data matrix may provide an m×n matrix. At this time, if the decoding key 211 is arranged in a k-th row of the decoding matrix, the decoded data matrix may extract a value of the k-th row of the m×n matrix included in the data bundle 300. The decoded m×n matrix may have a value of 0 in all rows other than the k-th row. That is, only some of data in the data bundle 300 may be extracted through the decoding key 211.

As another example, in the matrix operation, the key header 211a may determine which row of the decoding matrix 211 the decoding key 211 is arranged in. In this case, the decoding key 211 may be a value arranged in a specific row of the n×n decoding matrix. That is, the key header 211a may determine which data in the data bundle 300 is extracted by the arrangement of the decoding key 211. As a result, the key header 211a may determine the location of the data to be decoded by each of the transceivers 200 in the data bundle 300.

The main controller 100 may simultaneously transmit the group information 212 and the mapping information 213 to the transceivers 200 with the decoding key 211. The group information 212 may serve to determine data corresponding to a specific kind of transceivers 200 in the data bundle 300. That is, when various kinds of transceivers 200 are provided as a group, the group information 212 may transmit data corresponding to a kind of transceivers 200. The mapping information 213 may identify the location of its own data in the data bundle 300. That is, the mapping information 213 may perform a function similar to that of the key header 211a. The mapping information 213 and the decoding key 211 transmitted to one transceiver 200 may match with each other and the transceiver 200 may decode the desired data in the data bundle 200 only when the mapping information 213 and the decoding key 211 match each other. Accordingly, if the decoding key 211 is changed, the main controller 100 may again transmit the mapping information 213 matching the changed decoding key 211 to the transceivers 200 again.

Also, the group information 212 may match the decoding key 211 and the mapping information 213. Each of the transceivers 200 grouped by type may classify data to be decoded using the group information 212, and the transceivers 200 may decode some of data in the data bundle 300 in which the decoding key 211 and the mapping information 213 match each other.

The transceivers 200 may not receive data that does not have to be received through the group information 211 and may identify and decode the location of the data to be received using the decoding key 211 and the key header 211a. By doing so, it is possible to transmit and receive data between the main controller 100 and the transceivers 200 at a high speed. In addition, it is possible to strengthen security during the transmission of data by the process of encoding data and then decoding the data using the decoding key 211.

FIG. 5 is a diagram showing a method for processing data by a transceiver according to another exemplary embodiment of the present disclosure and FIG. 6 is a flowchart illustrating a data transmission method between a main controller and a transceiver according to another embodiment of the present disclosure. For the sake of simplicity of description, the contents overlapping with those of FIGS. 3 and 4 will not be described.

Referring to FIGS. 5 and 6, the transceivers 200 may transmit the authentication request signal 201 to the main controller 100 (S50). The main controller 100, which receives the authentication request signal of the transceivers 200, may transmit the authentication acceptance signal 210 to each of the transceivers 200. At this time, the decoding key 202 may be previously input to each of the transceivers 200. The decoding key 202 may include a key header 202a. In addition, if the transceivers 200 are grouped, the group information 203 may also be previously set in each of the transceivers 200. In addition, the mapping information 204 may also be previously set in each of the transceivers 200 as needed (S60). Then, the main processor 100 may transmit the data bundle 300. The data bundle 300 may be transmitted to the plurality of transceivers 200 in a broadcast mode (S70). The transceivers 200 may extract their data from the data bundle 300 through the group information 202, the decoding key 203, and the mapping information 204 that are input in advance. By doing so, it is possible to transmit and process the data between the main controller 100 and the plurality of transceivers 200 at a high speed.

When the previously input decoding key 211 is changed, the main controller 100 may transmit the decoding key 211 changed to the transceivers 200 and transmit the key header 202a or the mapping information 204 matched with the changed decoding key 211. To extract the desired data in the data bundle 300, the key header 202a or the mapping information 204 matched with the decoding key 211 may be required. Therefore, the key header 202a or the mapping information 204 matched with the decoding key 211 is preferably transmitted to the transceivers 200.

FIG. 7 is a diagram schematically showing a data transmission system according to another exemplary embodiment of the present disclosure. For the sake of simplicity of description, the overlapping contents will not be described.

Referring to FIG. 7, the main controller 100 may transmit a plurality of grouped data bundles 350 and 370 to a plurality of transceivers 250 and 270 in a multicast transmission mode. According to the present embodiment, the transceivers 250 and 270 may be grouped into first transceivers 250 and second transceivers 270. The first transceivers 250 and the second transceivers 270 may each be a device performing a similar function or a configuration attached to a device performing a similar function. The data bundles 350 and 370 may include the first data bundles 350 corresponding to the first transceivers 250 and the second data bundles 370 corresponding to the second transceivers 270.

The first transceivers 250 may determine the first data bundles 350 corresponding to their own groups in the data bundles 350 and 370 using the group information. Thereafter, the first transceivers 250 may identify a location of their own data in the first data bundles 350 using the decoding key and the mapping information, and extract the data.

The second transceivers 270 may determine the second data bundles 370 corresponding to their own groups in the data bundles 350 and 370 using the group information. Thereafter, the second transceivers 270 may identify a location of their own data in the second data bundles 370 using the decoding key and the mapping information and extract the data. That is, the transceivers 250 and 270 may select the data bundle to be received among the plurality of data bundles 350 and 370 using the group information, and may decode only the desired data in one data bundle using the decoding key and the mapping information matched with each other and receive the decoded data.

FIG. 8 is a flowchart illustrating a data transmission method between a main controller and a transceiver according still another embodiment of the present disclosure.

Referring to FIG. 8, a plurality of transceivers may be grouped into a plurality of transceiver groups according to their characteristics and types. Each of the grouped transceiver groups may transmit an authentication request signal to the main controller (S100). If receiving the authentication request signal, the main controller may transmit the authentication acceptance signal, the group information, and the decoding key to each of the transceiver groups (S110). Thereafter, the main controller may transmit the data bundles to each of the transceiver groups. The data bundles are a combination of data corresponding to the transceiver groups (S120). Each of the transceiver groups may select the data bundles corresponding to its own group among the data bundles through the group information (S130). Each of the transceiver groups may figure out the location of their own data using the decoding key to extract their own data and decode their own data encoded (S140).

According to an embodiment of the present disclosure, one data bundle may be transmitted to the plurality of transceivers through the broadcast or multicast transmission mode, and the transceivers may extract their own data from the data bundle through a decoding key. Therefore, it is possible to transmit data between the main controller and the transceivers at a high speed.

According to an embodiment of the present disclosure, the data bundle is encoded and each of the transceivers may decode the encoded data through the assigned decoding key. Therefore, it is possible to strengthen the security during the data transmission.

Although the exemplary embodiments have been described with reference to the accompanying drawings, those skilled in the art will appreciate that various modifications and alterations may be made without departing from the spirit or essential feature of the present disclosure. Therefore, it should be understood that the above-mentioned embodiments are not restrictive but are exemplary in all aspects. It will be apparent to those skilled in the art that various variations and modifications may be made without departing from the spirit and scope of the disclosure as defined in the following claims.

What is claimed is:

1. A data transmission method, comprising:
    transmitting an authentication request signal from a plurality of transceivers to a main controller;
    receiving an authentication acceptance signal from the main controller in response to the authentication request signal, and respectively receiving decoding keys corresponding to each of the transceivers from the main controller, wherein the decoding keys are independent and each dedicated to each of the transceivers, and used to respectively decode corresponding data block for the respective transceivers;
    transmitting at least one data bundle from the main controller to the transceivers, wherein the data bundle is formed by combing a plurality of data blocks and encoded to be transmitted to the transceivers in unit of the data bundle; and
    extracting, by each of the transceivers, corresponding data block among the data blocks from the encoded data bundle, by decoding the data bundle using a corresponding decoding key dedicated to each of the transceivers.

2. The data transmission method of claim 1, wherein the plurality of data blocks are encoded by an encoding key to form the at least one encoded data bundle.

3. The data transmission method of claim 1, wherein the corresponding data block extracted from the data bundle is decoded by a decoding key which a specific transceiver of the transceiver receives.

4. The data transmission method of claim 1, wherein each of the decoding keys includes a key header that identifies a location of data for a corresponding transceiver in the data bundle.

5. The data transmission method of claim 1, further comprising
    transmitting a changed decoding key from the main controller to a corresponding transceiver when the transmitted decoding key is changed.

6. The data transmission method of claim 5, further comprising
    transmitting changed mapping information corresponding to the changed decoding key from the main controller to the corresponding transceiver.

7. The data transmission method of claim 1, wherein
    the receiving of the decoding keys includes respectively receiving mapping information corresponding to each of the transceivers from the main controller, and
    the transceivers determine a location of their own data in the data bundle using the received mapping information.

8. The data transmission method of claim 7, wherein each mapping information includes unique information, and the mapping information and the decoding key transmitted to the one transceiver correspond to each other.

9. The data transmission method of claim 1, further comprising
    classifying the transceivers by group prior to transmitting the authentication request signal, wherein the transmitting of the at least one encoded data bundle includes transmitting different encoded data bundles from the main controller to each group of the transceivers.

10. The data transmission method of claim 9, wherein
the transmitting of the decoding keys includes transmitting separate group information for each of the transceivers from the main controller to the transceivers, and
the group information identifies a data bundle to be received by the transceivers in the at least one encoded data bundle.

11. The data transmission method of claim 10, wherein
the main controller transmits the plurality of grouped encoded data bundles to the transceivers, and
the transceivers select a data bundle among the plurality of encoded data bundles using the group information.

12. A data transmission method, comprising:
transmitting an authentication request signal from a plurality of transceivers to a main controller, wherein corresponding separate decoding keys are previously input to each of the transceivers, wherein the decoding keys are independent and each dedicated to each of the transceivers, and the decoding keys are used to respectively decode corresponding data block for the respective transceivers;
receiving an authentication acceptance signal from the main controller in response to the authentication request signal;
transmitting at least one data bundle from the main controller to the plurality of transceivers, wherein the data bundle is formed by combing a plurality of data blocks and encoded to be transmitted to the transceivers in unit of the data bundle; and
decoding, by each of the transceivers, corresponding data block among the data blocks encoded in in the data bundle using each corresponding decoding key of each of the transceivers.

13. The data transmission method of claim 12, wherein
each of the decoding keys includes a key header identifying a location of the transceiver's data in the at least one encoded data bundle, and
each of the transceivers decodes only the corresponding data block among the data blocks encoded in the data bundle using the key header and the decoding key.

14. The data transmission method of claim 12, wherein
corresponding separate mapping information is previously input to each of the transceivers, and
each of the transceivers determines a location of its data in the at least one encoded data bundle using the mapping information and extracts data corresponding to the decoding key.

15. The data transmission method of claim 12, further comprising
transmitting a changed decoding key from the main controller to the corresponding transceiver if the previously input decoding key is changed.

16. The data transmission method of claim 15, further comprising
transmitting changed mapping information corresponding to the changed decoding key from the main controller to the corresponding transceiver.

17. The data transmission method of claim 12, further comprising
classifying the transceivers by group, wherein the transmitting of the data bundle includes transmitting different encoded data bundles from the main controller to each of the plurality of transceiver groups.

18. The data transmission method of claim 17, wherein
the transmitting of the authentication acceptance signal from the mam controller to the transceivers includes transmitting separate group information from the main controller to each of the transceiver groups, and
the transceiver groups select a data bundle among the different encoded data bundles using the group information.

19. The data transmission method of claim 12, wherein the transmitting of the data bundle is performed in a broadcast mode or a multicast mode.

20. The data transmission method of claim 12, wherein a plurality of data blocks are encoded by an encoding key to form the at least one encoded data bundle.

* * * * *